US011875957B2

(12) United States Patent
Berner et al.

(10) Patent No.: US 11,875,957 B2
(45) Date of Patent: Jan. 16, 2024

(54) HIGH VOLTAGE ELECTRIC POWER SWITCH WITH CARBON ARCING ELECTRODES AND CARBON DIOXIDE DIELECTRIC GAS

(71) Applicant: Southern States, LLC, Hampton, GA (US)

(72) Inventors: Brian Berner, Meansville, GA (US); Joseph R Rostron, McDonough, GA (US); Brian Roberts, Atlanta, GA (US)

(73) Assignee: SOUTHERN STATES LLC, Hampton, GA (US)

(*) Notice: Subject to any disclaimer, the term of this patent is extended or adjusted under 35 U.S.C. 154(b) by 0 days.

(21) Appl. No.: 17/750,544

(22) Filed: May 23, 2022

(65) Prior Publication Data

US 2022/0285111 A1 Sep. 8, 2022

Related U.S. Application Data

(63) Continuation of application No. 17/137,132, filed on Dec. 29, 2020, now Pat. No. 11,380,501.

(60) Provisional application No. 62/956,009, filed on Dec. 31, 2019.

(51) Int. Cl.

*H01H 33/42* (2006.01)
*H01H 33/56* (2006.01)
*H01H 33/82* (2006.01)

(52) U.S. Cl.

CPC ............ *H01H 33/82* (2013.01); *H01H 33/42* (2013.01); *H01H 33/565* (2013.01)

(58) Field of Classification Search

CPC ...... H01H 33/82; H01H 33/42; H01H 33/565; H01H 33/182; H01H 33/12; H01H 33/7023; H01H 33/22; H01H 2033/566; H01H 1/385; H01H 1/02; H01H 1/021

USPC ......... 218/48, 30, 45, 51; 200/262, 264, 267

See application file for complete search history.

(56) References Cited

U.S. PATENT DOCUMENTS

| | | | | |
|---|---|---|---|---|
| 4,707,576 A * | 11/1987 | Gessinger | H01H 1/027 | 200/267 |
| 6,211,478 B1 * | 4/2001 | Schoenemann | H01H 11/041 | 218/16 |
| 6,259,050 B1 * | 7/2001 | Zehnder | H01H 33/12 | 218/123 |
| 7,677,915 B2 * | 3/2010 | Bessede | H01H 1/5833 | 439/459 |
| 7,816,618 B2 * | 10/2010 | Uchii | H01H 33/56 | 218/51 |
| 8,106,326 B2 * | 1/2012 | Nakauchi | H01H 31/003 | 218/55 |

(Continued)

*Primary Examiner* — William A Bolton

(74) *Attorney, Agent, or Firm* — MEHRMAN LAW OFFICE; Michael J. Mehrman

(57) ABSTRACT

A high voltage electric switch includes contacts with graphite carbon electrode forming the arc gap. In addition, the carbon contacts are located in a chamber containing at least 60% carbon dioxide (CO2) as a dielectric gas to achieve improved arc interrupting performance. In conventional switches, the metallic contacts introduce metallic vapors into the arc plasma that inhibits the ability of the dielectric gas to interrupt high voltage, high current arcs. As the element carbon is inherently present in CO2 gas, the addition of vapors from the carbon electrodes into the dielectric gas does not significantly interfere with the dielectric arc-interrupting performance of the CO2 dielectric gas.

20 Claims, 10 Drawing Sheets

(56) References Cited

U.S. PATENT DOCUMENTS

| | | | | |
|---|---|---|---|---|
| 8,902,026 | B2 * | 12/2014 | Fujita | H01H 33/182 218/27 |
| 9,117,608 | B2 * | 8/2015 | Nakada | H01H 33/12 |
| 9,524,837 | B2 * | 12/2016 | Froebel | H01H 33/12 |
| 2007/0246444 | A1 * | 10/2007 | Saxl | H01H 1/385 218/16 |
| 2014/0360984 | A1 * | 12/2014 | Moriyama | H01H 33/12 218/146 |

* cited by examiner

42a
SHAFT
39
ROD
45
COLLAR
44
FASTENER
43
SHOULDER
41
CARBON ELECTRODE
40a
MALE CONTACT

46
DETENT GROOVE
42b
SHAFT
41
CARBON ELECTRODE
40b
MALE CONTACT

42c
SHAFT
49
HOSEL
47
RECESSED SHOULDER
48
NECK
41
CARBON ELECTRODE
40c
MALE CONTACT

42d
SHAFT
45
DETENT GROOVE
45
RECESSED SHOULDER
41
CARBON ELECTRODE
40d
MALE CONTACT

HIGH VOLTAGE ELECTRIC POWER SWITCH WITH CARBON ARCING ELECTRODES AND CARBON DIOXIDE DIELECTRIC GAS

REFERENCE TO RELATE APPLICATIONS

This application claims priority to U.S. patent application Ser. No. 17/137,132 filed Dec. 29, 2020, which claims priority to U.S. Provisional Pat. App. Ser. No. 62/956,009 filed Dec. 31, 2019, which are incorporated by reference.

TECHNICAL FIELD

The present invention relates to the field of high voltage electric power systems and, more particularly, to a high voltage electric power switch with carbon arcing electrodes and carbon dioxide dielectric gas.

BACKGROUND OF THE INVENTION

Since the 1950's, high voltage arcing contacts have been operated within sealed containers filled with a dielectric gas, such as sulfur-hexafluoride (SF6). These electric power switches may be referred to as "gas disconnect switches" or "gas circuit breakers." They typically use spring toggle actuators to move electric contacts into physical and electrical contact with each other to open and close current paths through electric power lines at high speed to extinguish plasma arcs drawn between the contacts. The arcs are usually extinguished within about two electric power cycles (about 33 msec at 60 Hz; about 40 msec at 50 Hz) to limit the restrike voltage. The actuator that drives the electric contacts directs the dielectric gas into the arc gap between the electric contacts to insulate and absorb the energy of the arcing plasma through ionization of the dielectric gas allowing the arcing contacts to achieve superior arc interrupting performance at an economical manufactured cost. This can be conceptualized as "puffing" or "flowing" the dielectric gas into the arc gap to help "blow out" the arc that forms between the electric contacts. While SF6 is the most commonly used dielectric gas, pure vacuum has also been used as a dielectric medium. But vacuum switches are rather costly at high voltages and interrupting currents, and they are very sensitive to even small amounts of metallic vapors contaminating the vacuum.

A variety of contactors with different shapes have been developed over the years, including penetrating tulip-and-pin contactors, butt contactors, mushroom contactors, and rotating arc contactors. For example, U.S. Pat. Nos. 6,236,010 and 8,063,333, which describe penetrating contactors, and U.S. Pat. No. 8,274,007, which describes rotating arc contactors, are incorporated by reference. U.S. Pat. Nos. 6,236,010; 7,745,753 and 8,063,333 describing single-motion contactors (one contact moving) are incorporated by reference. U.S. Pat. No. 9,620,315 describing double-motion contactors (both contacts moving) is incorporated by reference. A variety of gas flow techniques have also been developed, such as self-blast and arc-assist contactors. For example, U.S. Pat. No. 3,949,182 describing self-blast contactors and U.S. Pat. No. 4,774,388 describing arc-assist contactors are also incorporated by reference.

Contacts in high voltage electric power switches have traditionally been fabricated from metals with high temperature melting points, such as copper, tungsten, silver and related alloys. These metallic arcing contacts exhibit long life and can withstand high continuous electric currents when the contactors are in the closed positions. With metallic contacts, the arcing that takes place inside the dielectric container eventually erodes the contacts, which introduces gasified metallic vapors into the dielectric gas chamber. Although SF6 is relatively tolerant of this type of contamination due to its superior dielectric performance, other dielectric media, such as pure vacuum and less effective dielectric gasses, are less tolerant of contamination. While SF6 is a very effective dielectric gas for arcing electric power switches, it is also a very potent greenhouse gas estimated to be over 20,000 more effective than carbon dioxide (CO2) as a potential global warming greenhouse agent. Even a small amount of SF6 gas released into the atmosphere can therefore have significant negative environmental consequences. To mitigate this potential environmental impact, cost effective alternatives to SF6 gas are needed for high voltage electric power switches. The search continues because all known alternative dielectric gasses exhibit inferior dielectric insulating and interrupting performance. Accordingly, there is an ongoing need for improved high voltage electric power switches that do not utilize SF6 dielectric gas.

SUMMARY OF THE INVENTION

The present invention meets the needs described above through high voltage electric power switches that include electric contacts with graphite carbon electrodes utilizing carbon dioxide (CO2) as a dielectric gas. Because graphite carbon is fragile, the carbon electrodes are shaped to avoid or mitigate damage that could be caused by the carbon electrodes physically impacting each other or other components of the contactors during switch operation. A variety of high voltage electric power switches utilize carbon electrodes and CO2 dielectric gas including penetrating, butt, mushroom, rotating arc, single-motion, double motion, self-blast and arc-assist contactors.

DETAILED DESCRIPTION OF ILLUSTRATIVE EMBODIMENTS

The present invention may be embodied in a high voltage electric switch with "carbon contacts" that include electrodes that form the arc gap fabricated from graphite carbon. In addition, the carbon contacts are located in a chamber containing at least 60% carbon dioxide (CO2) as a dielectric gas. The dielectric gas may also contain a portion of air, nitrogen, helium, or another suitable component. In conventional switches, metallic arcing contacts introduce metallic vapors into the arc plasma that inhibits the ability of the dielectric gas to interrupt high voltage, high current arcs. As the element carbon is inherently present in CO2 gas, the addition of vapors from the carbon electrodes into the arc plasma does not significantly interfere with the dielectric arc-interrupting performance of the CO2 gas.

Traditional high voltage electric switch contact are fabricated from tungsten, copper and silver alloys that introduce metal vapors into the dielectric gas, which inhibits the arc extinguishing performance of the dielectric gas. The material forming the contact is introduced into the arc plasma because the extremely high temperature of the arcing plasma is many times hotter than the melting and vaporization temperatures of all elements. As a result, vapors containing the contact material are always present in the arcing plasma. When SF6 is utilized as the dielectric gas, these metallic vapors are tolerated because the overall performance of the dielectric gas is so high that it still meets the requirements of circuit interruption at a reasonable manufactured cost.

Pure carbon comes in several forms including diamond, graphene and graphite. Carbon can also be combined with hydrocarbons to create carbon polymers. Among these choices, diamond in not electrically conductive, graphene is formed in thin fibers and sheets, and carbon polymers melt at the extremely high temperatures experienced in electric arc plasma. Graphite carbon is a good electric conductor that can be easily formed into structures suitable for use as electrodes. Graphite electrodes are used, for example, in arc furnaces to add carbon to iron to manufacture steel. But graphite has found only limited use in high voltage electric power switches because graphite is very fragile and tends to break apart under the mechanical stresses applied to the contacts in typical high voltage electric power switches. Embodiments of the present invention overcome this drawback by carefully designing the graphite electrodes to mitigate the mechanical stresses applied to the carbon contacts during the operation of the high voltage electric power switches. This allows high voltage electric power contacts with graphite carbon electrodes to be located inside sealed containers where CO2 is used as a dielectric gas.

Figure 1:
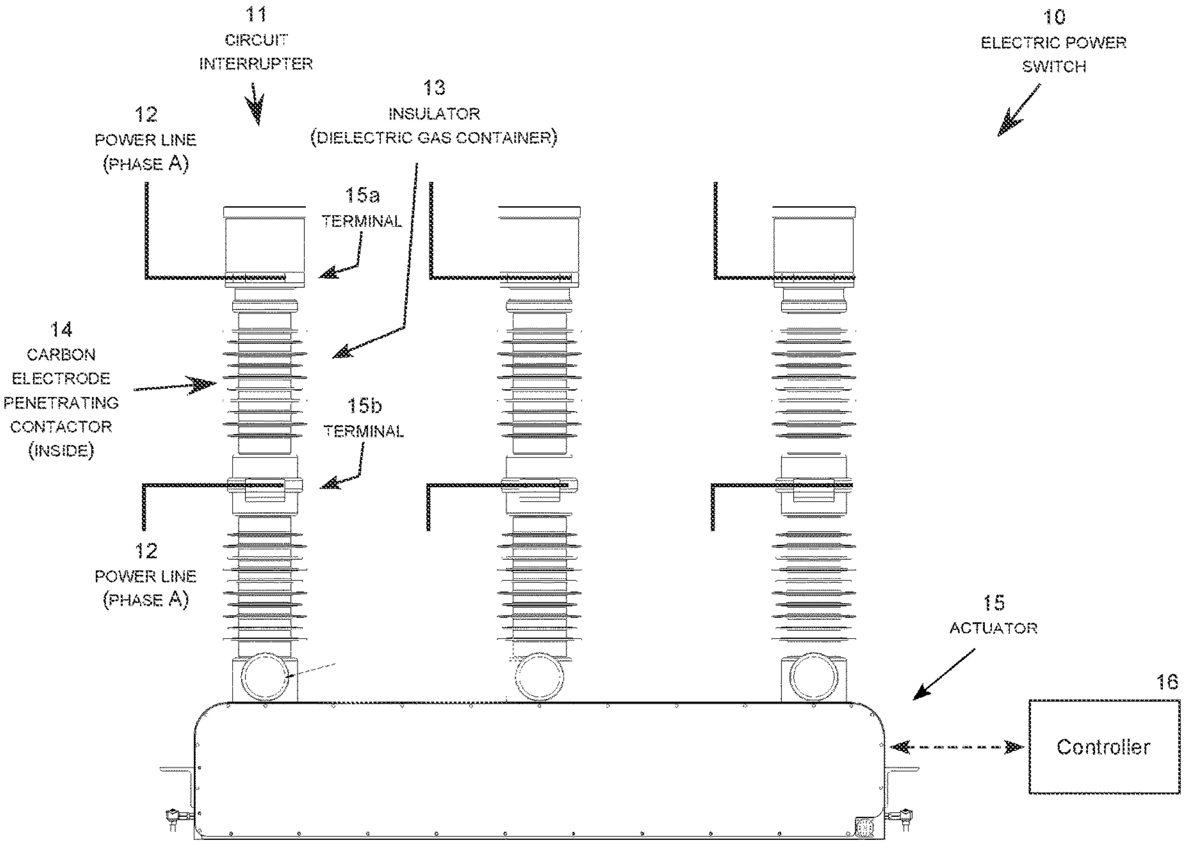
FIG. 1 is a side view of a high voltage electric power switch.

FIG. 1 is a side view of a high voltage electric power switch 10 including three electric power switches referred to as circuit interrupters represented by the enumerated circuit interrupter 11, one for each phase of a three-phase electric power line. The circuit interrupter 11 is operative to open and close a current path along an electric power line 12, in this example a phase conductor of a three-phase power line. The power line connects to terminals 15*a*, 15*b* on opposing sides of an insulator 13. The interior of the insulator serves as a sealed container housing a dielectric gas and a carbon electrode penetrating contactor 14 located inside the insulator. An actuator 15 drives the circuit interrupter 11 as instructed by a controller 16, which can be local or remote or a combination of local and remote components. The actuator 15 includes a spring toggle mechanism with a motor that charges the spring and a latch that releases the spring when tripped. Examples of conventional versions of this type of switch are described in U.S. Pat. Nos. 6,236,010; 7,745,753 and 8,063,333, which describe penetrating contactors, and U.S. Pat. No. 8,274,007, which describes rotating arc mushroom contactors. The electric power switch 10 may be largely conventional except for the innovative use of graphite carbon electrodes and CO2 as a dielectric gas medium. The electric power switch 10 is one specific illustrative embodiment of a wide range of high voltage electric power switch that can utilize graphite carbon electrodes and CO2 as a dielectric gas medium.

Figure 2:
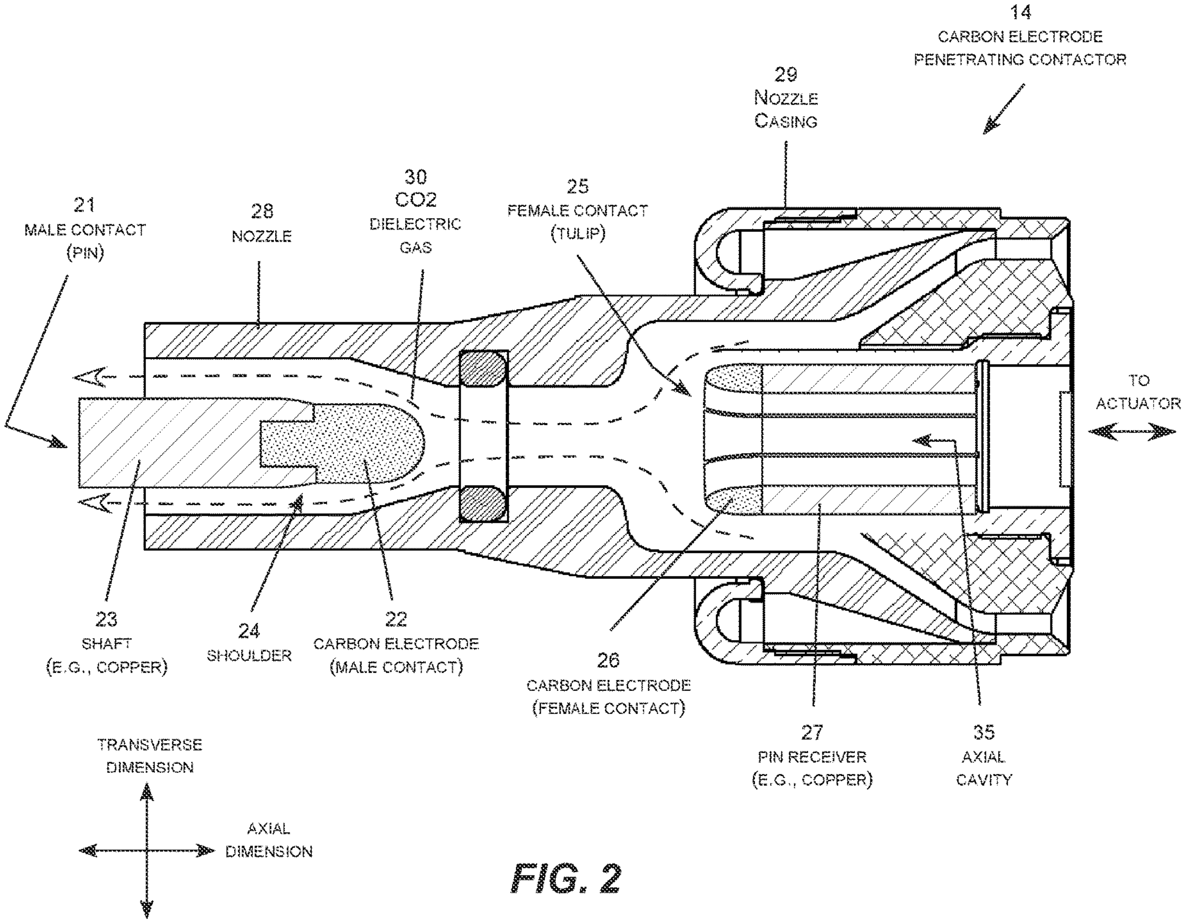
FIG. 2 is a side cross-section view of a carbon electrode penetrating contactor.

FIG. 2 is a side cross-section view of the carbon electrode penetrating contactor 14 which, in this particular example, is a single-motion switch. Axial and transverse dimensions are indicated for reference. The penetrating contactor 14 includes a male contact 21, often referred to as the "pin," that includes a graphite carbon electrode 22 attached to the end of a shaft 23 typically fabricated from a metal, such as copper, used to carry high electric power current. The shaft 24 is elongated in an axial dimension (the dimension of contact movement) and has a bore (the diameter in the transverse dimension orthogonal to the axial dimension) that is slightly larger than the bore of the carbon electrode 22. The penetrating contactor 14 also includes a female contact 25, often referred to as the "tulip," that includes a carbon electrode 26 carried on the end of a pin receiver 27 typically fabricated from a metal, such as copper, used to carry high electric power current. The carbon electrode 26 and pin receiver 27 are cylindrical with a hollow axial cavity 35 into which the penetrating contactor 14 enters to form a physical and electrical connection between the male contact 21 and the female contact 25.

In this particular embodiment, the axial dimension shown as horizontal in FIG. 2 is vertical in FIG. 1 with the male contact 21 in a fixed position oriented toward the top of the penetrating contactor 14 as shown in FIG. 1. The female contact 25 is positioned within a nozzle 28 connected to a nozzle casing 29, which is connected to an actuator rod driven by the actuator 15. The actuator drives the female contact 25, nozzle 28 and nozzle casing 29 into and out of engagement with the male contact 21 to close and open an electric current path along the power line 12. As the male contact 21 and the female contact 25 close and open the current path, the nozzle 28 directs the CO2 dielectric gas 30 into the arc gap between the contacts to extinguish a plasma arc that develops between the contacts.

The carbon electrodes 22 and 26 are fabricated from graphite carbon, which is a very effective electric conductor. The contactor 14 ensures that the arc occurs between the carbon electrodes 22 and 26 by positioning the carbon electrodes at the leading edges of the arc gap. The repeated arc eventually erodes the carbon electrodes 22 and 26, which causes carbon vapors to be introduced into the CO2 dielectric gas 30. This does not significantly impact the dielectric performance of the dielectric gas because the CO2 dielectric gas inherently contains carbon. The carbon electrodes 22 and 26 are also sized and positioned to prevent the metallic shaft 23 and pin receiver 26 from eroding due to arc conduction. Once the carbon electrodes 22 and 26 become spent from arc erosion, the contacts 21, 25 are replaced. If desired, the contacts 21, 25 can be refurbished by replacing the carbon electrodes 22, 26 allowing the copper shaft 23 of the male contact 21 and the copper pin receiver 27 of the female contact 25 to be recycled.

Figure 3A:
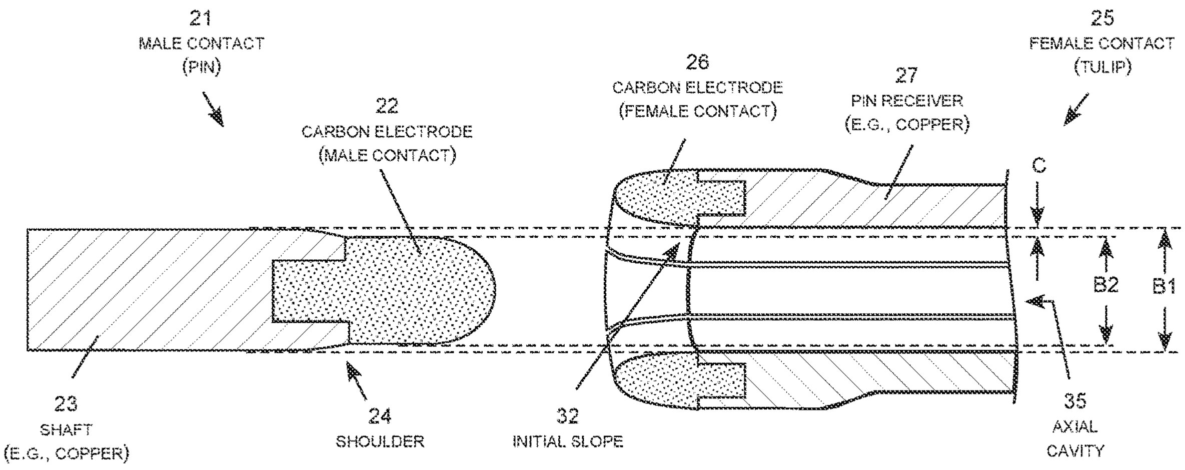
FIG. 3A is a side cross-section view of male and female contacts of the carbon electrode penetrating contactor in an open position.
Figure 3B:
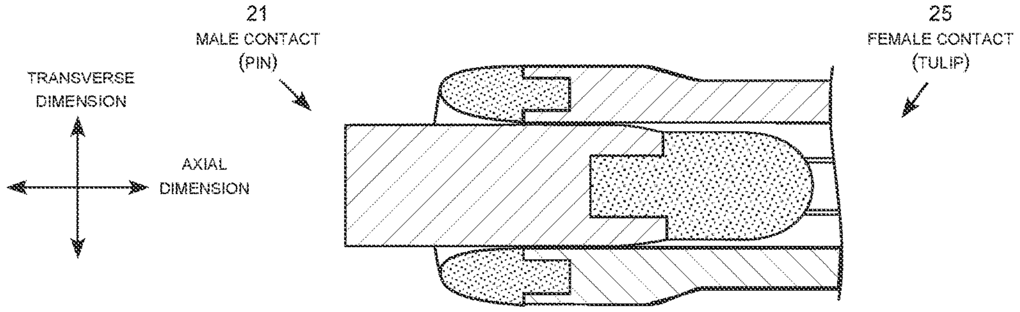
FIG. 3B is a side cross-section view of the male and female contacts of the carbon electrode penetrating contactor in a closed position.

Because graphite carbon is fragile, the contacts 21, 25 are shaped to prevent the carbon electrodes 22, 26 from physically impacting each other or other components of the contactor during switch operation. FIG. 3A shows the male and female contacts 21, 25 in the open position, and FIG. 3B shows the contacts in the closed position. The shoulder 23 of the male contact 21 allows the shaft 23 to have a bore B1 (i.e., diameter in the transverse dimension) that is slightly larger than the bore B2 of the carbon contact 22. Similarly, the carbon electrodes 26 of the female contact 25 defines a cavity with a bore approximating the bore B1 creating a clearance C between the carbon electrodes 22, 26 to prevent them from impacting each other during switch operation. The carbon electrode 26 of the female contact 25 also has an initial slope from the junction 32 between the carbon electrode 26 and the pin receiver 27 outward in the transverse dimension (i.e., away from the axial cavity 35) to prevent the shaft 23 of the male contact 21 from impacting the carbon electrode 26 of the female contact 25 during switch operation. Although the overall size of the male contact 21 may vary somewhat based on the rated voltage and current, 20 mm is a typical bore B1. For a male contact 21, the clearance C may be about one mm resulting in a bore B2 of 18 mm, which represents a 10% reduction (2 mm) in the diameter of the carbon electrode 22 (18 mm) versus the shaft 23 (20 mm).

Figures 4A, 4B, 4C, 4D:
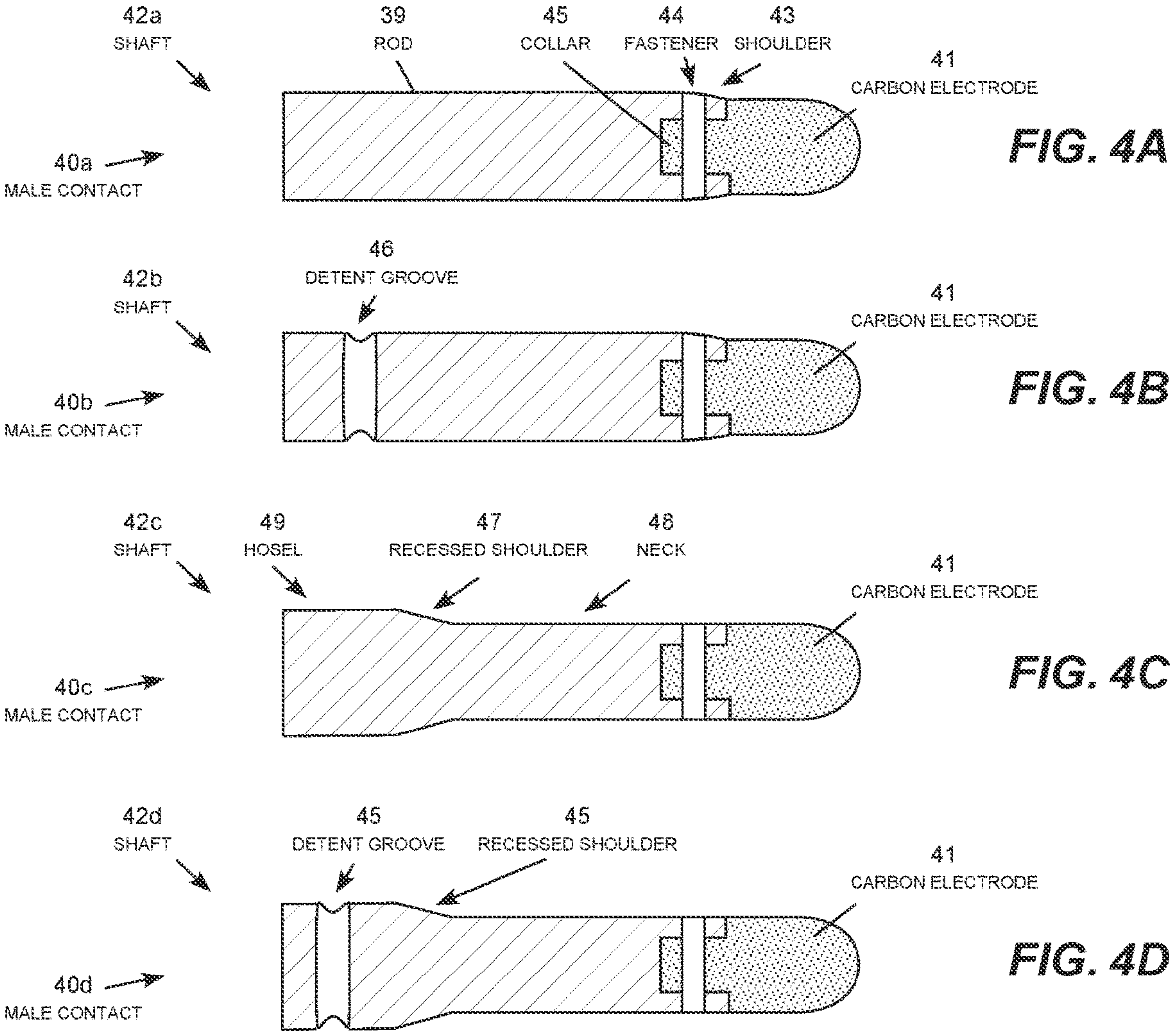
FIGS. 4A-4D are side cross-section views of alternative male contacts of the carbon electrode penetrating contactor.

FIGS. 4A-4D are side cross-section views of alternative male contacts 40*a*-40*d*. The carbon electrode 41 at the end of the each male contacts 40*a*-40*d* has a smooth and gently sloping outer profile in the arc zone and a smooth transition between the electrode and the shaft of the male contact to minimize the propensity for restrike. The male contact 40*a* shown in FIG. 4A has a shaft 42*a* including a rod 39 that terminates at a shoulder 43 in the axial dimension, where the shaft connects to a carbon electrode 41. The carbon electrode has a bore that is narrower than the bore of the rod 39 in the transverse dimension. There are several options for attaching the carbon electrode 41 to the shaft 42*a*. For example, threads can be machined into a collar 45 of the carbon electrode 41 and a socket at the end of the shaft allowing the carbon electrode to be screwed into the shaft. This approach can be difficult to execute, however, due to the fragility of the graphite carbon electrode 41. Another approach includes a metallic fitting that screws into the socket with prongs supporting the carbon electrode 41. This approach requires a complex part, the fitting, along with delicate machining to avoid exposed edges that could increase the electric stress in the arc zone resulting in a higher restrike propensity. While an adhesive is another option, there are few if any adhesives available that can withstand the extremely high temperatures present in high voltage arcing plasma. To avoid these difficulties, FIG. 4A illustrates a metallic fastener 44 that extends through the shoulder 43 and the collar 45 of the carbon electrode 41. The metallic fastener 44 can be threaded or brazed to the metallic shoulder to avoid delicate machining of the carbon electrode 41, fashioning an additional fitting, or the use of an adhesive.

There are several options for shaping the male contact. FIG. 4B illustrates the addition of a detent groove 46 toward the axial end of the shaft 42*b* away from the carbon electrode. The detent groove 46 receives detent bumps or ribs of the female contact to form a detent interface improving the current carrying connection between the contacts. The switch is more vulnerable to high voltage restrikes during the opening stroke due to the widening arc gap between the contacts during the opening stroke. The detent interface provides axial resistance before the contacts release for axial movement during the opening stroke of the switch. This can be conceptualized as allowing the spring toggle mechanism to "take up slack" and slightly increase the spring charge before the contacts release during the opening stroke. The axial resistance of the detent mechanism assists in minimizing the restrike propensity by increasing the separation velocity of the contacts during the opening stroke of the switch.

FIG. 4C illustrates another option, in which the shaft 42*c* includes a recessed shoulder 47 that is spaced apart in the axial dimension away from the electrode 41 creating an elongated neck 48 in the axial dimension. The elongated neck 48 fairs smoothly to the recessed shoulder 47, which fairs smoothly to a hosel 49 in the axial dimension. In this embodiment, the hosel 49 is wider in the transverse dimension (i.e., has a larger diameter) than the shaft 42*a* of the male contact 40*a* shown in FIG. 4A. The wider hosel 49 fits more tightly into the pin receiver of the female contact creating a type of detent connection with the female contact. FIG. 4D illustrates another embodiment of the male contact 40*d* that combines the recessed shoulder 45 of the male contact 40*c* shown in FIG. 4C with the detent groove 45 of the male contact 40*b* shown in FIG. 4B.

Figure 5A:
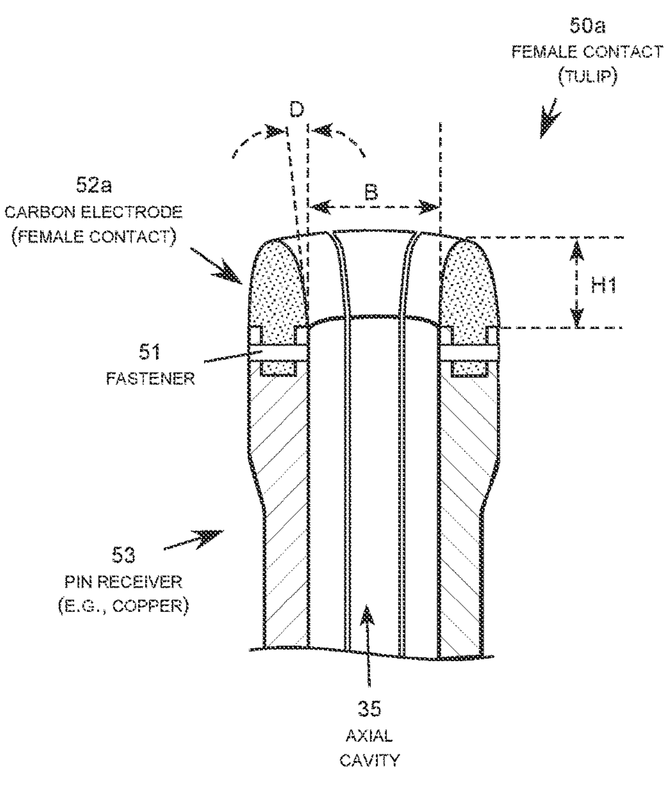
FIGS. 5A-5D are side cross-section views of alternative female contacts of the carbon electrode penetrating contactor.
Figure 5B:
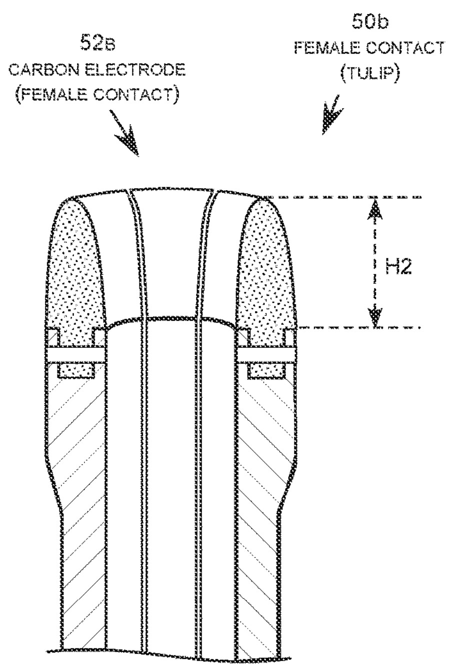

FIGS. 5A-5D are side cross-section views of alternative female contacts 50*a*-50*d*. Referring to FIG. 5A, a metallic fastener 51 connects to the carbon electrode 52*a* to the pin receiver 53 for the reasons described above with reference to the fastener 44 of the male contact. The female contacts 50*a*-50*d* each have a smooth and gently sloping outer profile in the arc zone and a smooth transition between the electrode and the pin receiver to minimize the propensity for restrike. Although the overall size of the female contact may vary based on the rated voltage and current, as noted previously a typical bore B is 20 mm. In this example, the height H1 of the carbon electrode 52*a* is about 18 mm and the deflection angle D of the initial slope of the carbon electrode 52*a* is about 5 degrees toward the transverse dimension away from the cavity 35. Alternative embodiments may be fabricated by varying the height of the carbon electrode, as shown in FIG. 5B, where the height 112 is about 20 mm, which is greater than the height H1 shown in FIG. 5A. In general, changing the height of the electrode also changes the deflection angle D in the transverse dimension, which typically falls in the range of 2 to 12 degrees.

Figure 5C:
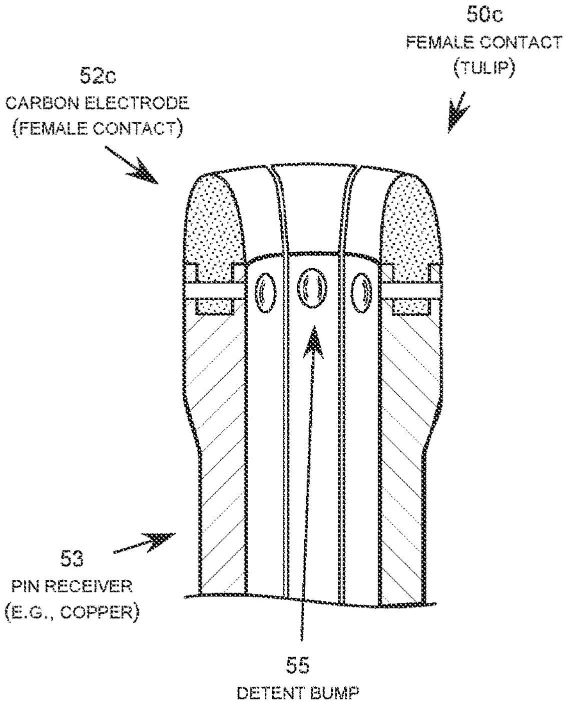
Figure 5D:
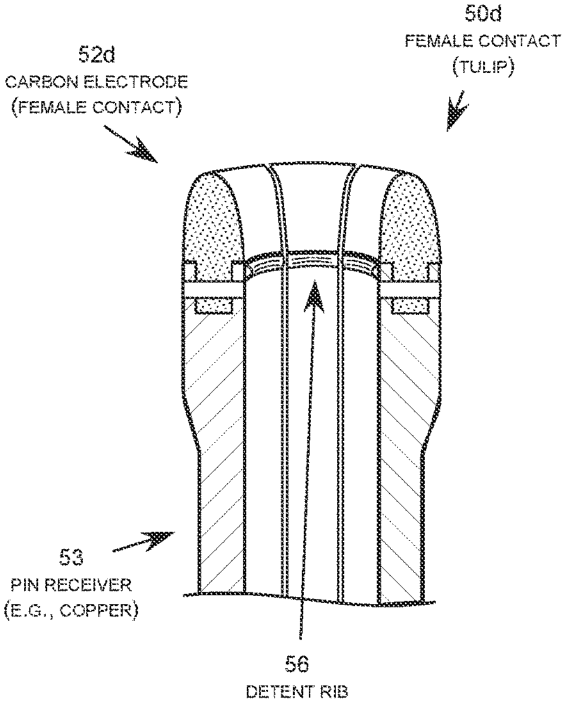

FIG. 5C illustrates another optional feature of the female contact 50*c* in which hemispherical or oblong hemispherical metallic detent bumps represented by the enumerated detent bump 55 are positioned on the pin receiver 53 adjacent to the junction between the carbon electrode 52*c* and the pin receiver 53. FIG. 5D illustrates another feature in which the female contact 50*d* includes metallic detent ribs represented by the enumerated detent rib 56 positioned on the pin receiver 53 adjacent to the junction between the carbon electrode 52*d* and the pin receiver 53. The detent bumps or detent ribs of the female contacts are releasably received into the detent groove of the male contacts when the contacts are in the closed position, as described previously.

Figure 6A:
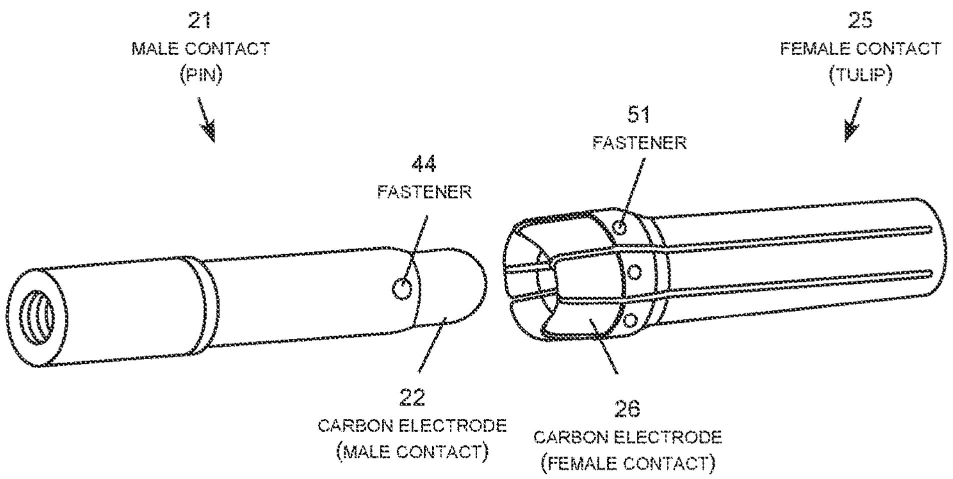
FIG. 6A is a perspective view of male and female contacts of the carbon electrode penetrating contactor in an open position.
Figure 6B:
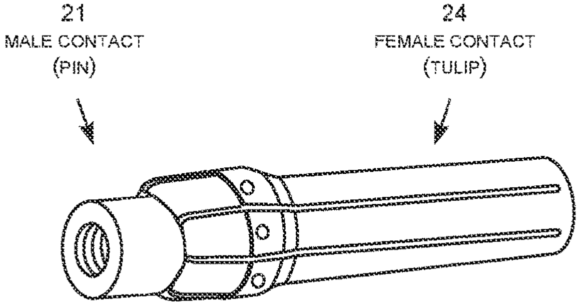
FIG. 6B is a perspective view of male and female contacts of the carbon electrode penetrating contactor in a closed position.
Figure 7:
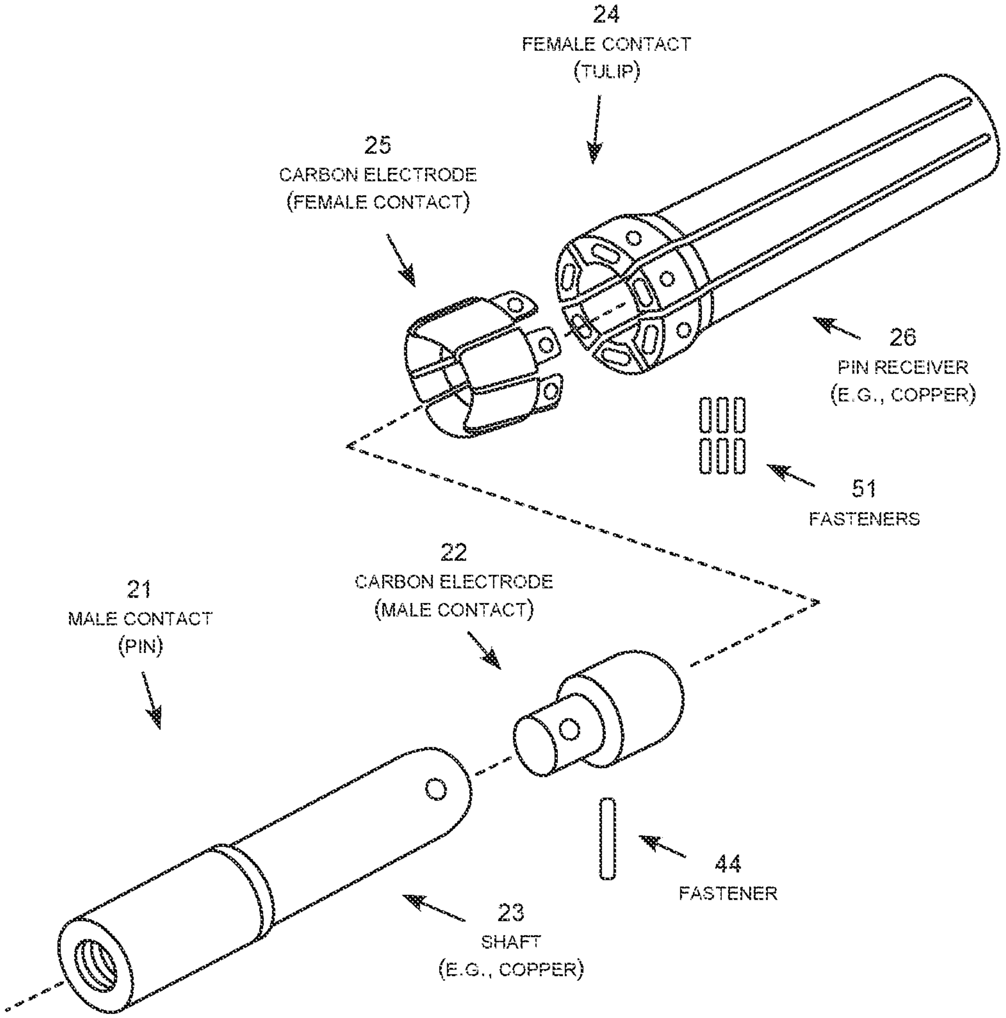
FIG. 7 is a perspective exploded view of male and female contacts of the carbon electrode penetrating contactor.

FIG. 6A is a perspective view of the male and female contacts 21, 25 illustrating the male and female carbon electrodes 22, 26 in an open position. This figure also shows the metallic fasteners 44, 51 described previously. FIG. 6B shows the same components in a closed position, while FIG. 7 is an exploded view of the same components.

While the "puffer" type contactor with penetrating contacts represents one particular type of high voltage electric power switch using carbon electrodes and $CO_2$ dielectric gas, this innovation is widely applicable to other types of electric switchgear. Alternative embodiments can be created, for example, by utilizing double-motion contactors (both contacts move in the axial dimension) instead of single-motion contactors (only one contact moves in the axial dimension). U.S. Pat. Nos. 6,236,010; 7,745,753 and 8,063,333 describe "puffer" type single-motion contactors, and U.S. Pat. No. 9,620,315 describes double-motion contactors, in greater detail.

Figure 8:
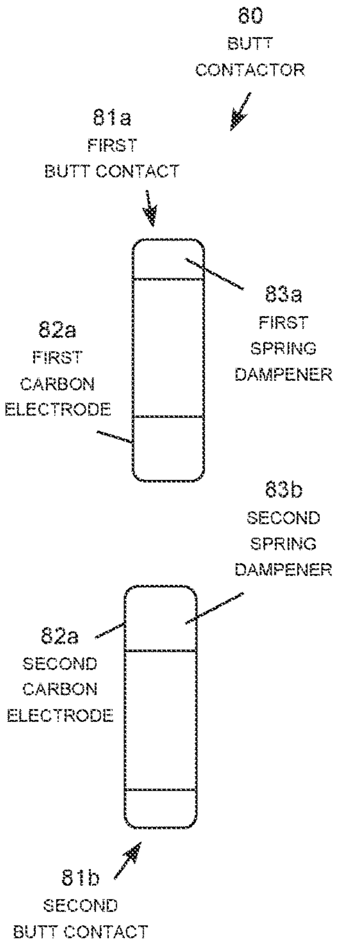
FIG. 8 is a side view of a carbon electrode butt contactor.
Figure 9:
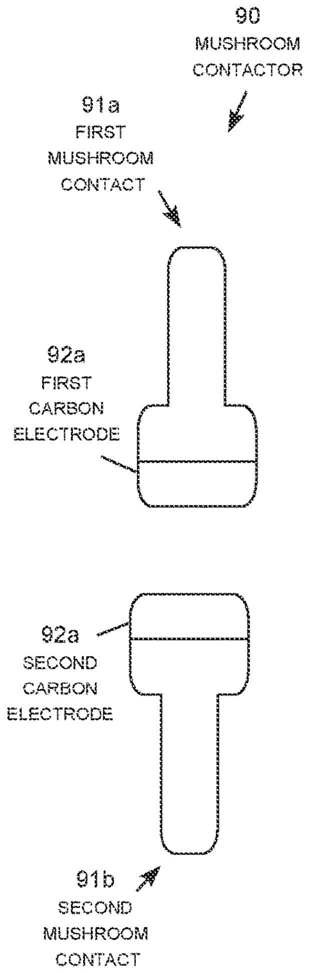
FIG. 9 is a side view of a carbon electrode mushroom contactor.
Figure 10:
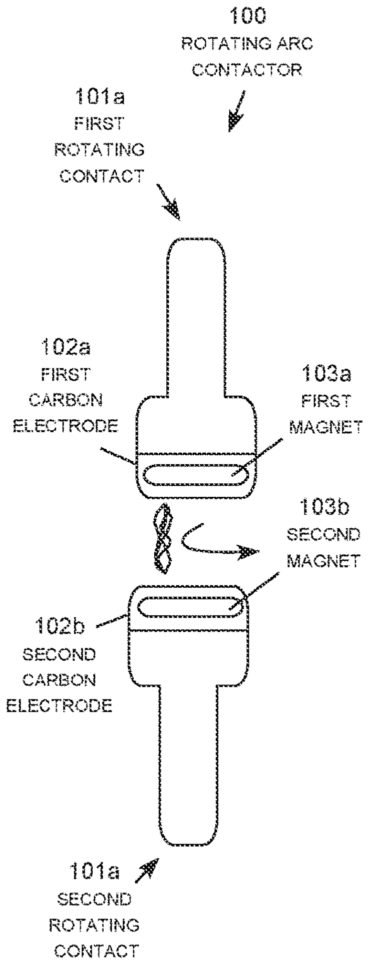
FIG. 10 is a side view of a carbon electrode rotating arc contactor.

Additional alternative embodiments can also be fabricated by varying the type of contactor. A first example is illustrated by FIG. 8 showing a butt contactor 80 that includes first and second butt contacts 81*a*-81*b* with first and second carbon electrodes 82*a*-82*b*, respectively. U.S. Pat. Nos. 6,236,010, 7,745,753 and 8,063,333 describe penetrating contactors in greater detail. Butt contactors have been used for decades often for lower voltage switches. A second example is illustrated by FIG. 9 showing a mushroom contactor 90 that includes first and second mushroom contacts 91*a*-91*b* with first and second carbon electrodes 92*a*-92*b*, respectively. Mushroom contacts have also been in use for decades. A third example is illustrated by FIG. 10 showing a mushroom contactor 100 that includes first and second mushroom contacts 101*a*-101*b* with first and second carbon electrodes 102*a*-102*b*, respectively, that include first and second magnets 103*a*-103*b*, respectively. The magnets sweep the arc through the dielectric gas to help extinguish the arc. FIG. 10 illustrates this feature in a conceptual manner, while U.S. Pat. No. 8,274,007 describes a rotating arc contactor in greater detail. It will be appreciated that the actuators in switches using these types of contacts should be carefully designed to limit the impact force between the contacts to avoid damaging the fragile carbon contactors. Referring to FIG. 8, for example, the first and second contacts 81*a*-81*b* include first and second spring dampeners 83*a*-83*b*, respectively, to allow the contacts 80*a*-80*b* to retract in the axial dimension upon contact to minimize the impact force on the carbon electrodes 82*a*-82*b*.

Figure 11:
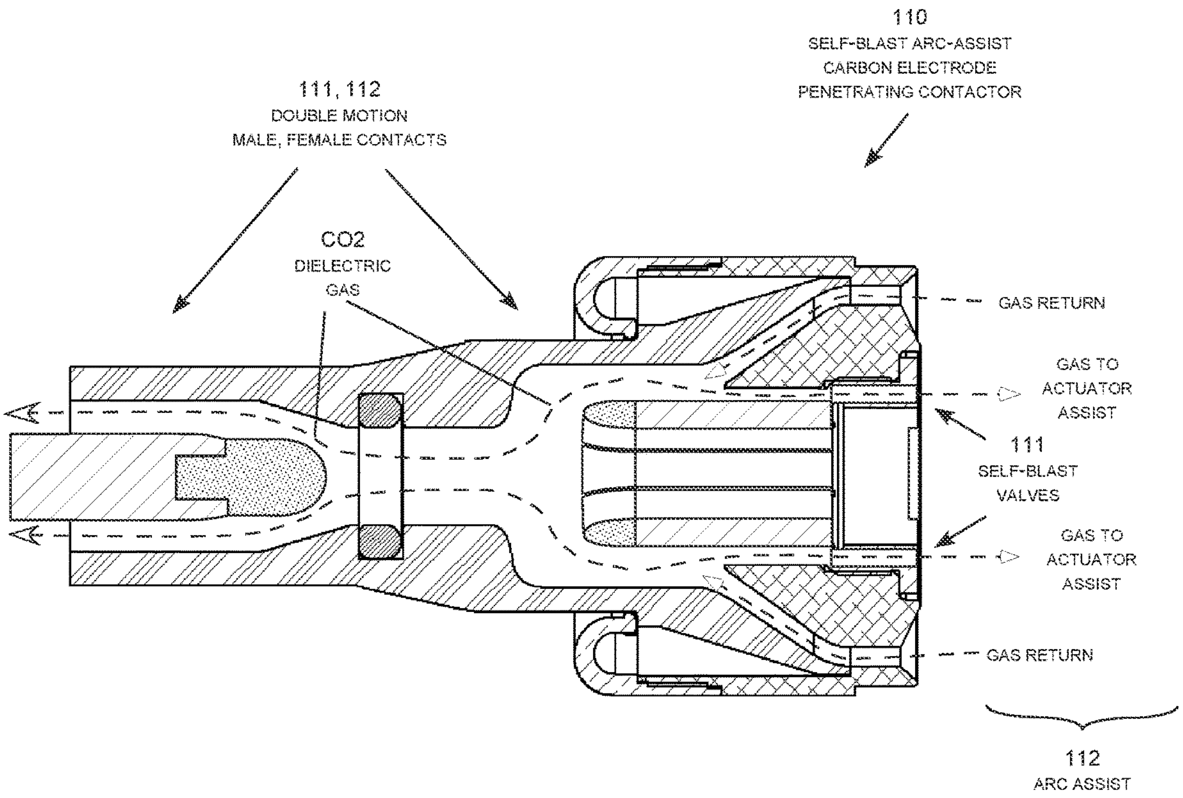
FIG. 11 is a side cross-section view of a self-blast arc-assist carbon electrode penetrating contactor.

FIG. 11 is a side cross-section view of additional features that can be incorporated into a carbon electrode penetrating contactor. This example includes a self-blast, arc-assist carbon electrode penetrating contactor 110, which includes a number of self-blast valves represented by the enumerated self-blast valve 111. This feature releases and recirculates a portion of the $CO_2$ dielectric gas to limit the pressure inside dielectric container to the amount required to effectively extinguish the arc. Higher heat resulting from higher arc current causes the self-blast valve 111 to increase the pressure inside the dielectric container, while the self-blast valve reduces the pressure during lower current arcs producing lower heat inside the container. The self-blast valve reduces the switch operating energy, particularly when most of the switch operations involve lower current arcs. As another energy saving technique known as "arc assist" is implemented by routing the dielectric gas expended through the self-blast valve through the switch actuator to aid in the mechanical operation of the actuator. FIG. 11 illustrates these features in a conceptual manner, while U.S. Pat. No. 3,949,182 describes a self-blast contactor, and U.S. Pat. No. 4,774,388 describes an arc-assist contactor, in greater detail.

It should be understood that the foregoing relates only to the exemplary embodiments of the present invention, and that numerous changes may be made therein without departing from the spirit and scope of the invention as defined by the following claims.

The invention claimed is:

1. A high-voltage electric power switch comprising:
- a sealed container housing a dielectric gas comprising at least 60% carbon dioxide;
- a male electric contact located within the container comprising a metallic pin carrying a male carbon electrode;
- a female electric contact located within the container comprising a metallic pin receiver carrying a female carbon electrode positioned to receive the metallic pin within the metallic pin receiver;
- an actuator for driving the male or female electric contact along an axial direction for opening and closing a current path for an electric power line through the male electric contact and the female electric contact;
- the male carbon electrode and the female carbon electrode forming an arc gap for the current path during the opening and closing of the current path;
- wherein the female carbon electrode comprises a shape preventing or mitigating physical contact with the male electric contact when the actuator drives the metallic pin into physical contact with the metallic pin receiver.

2. The high-voltage electric power switch of claim 1, wherein:
- the female electric contact comprises a junction between the female carbon electrode and the metallic pin receiver;
- the female carbon electrode defines an initial slope at the junction away from the axial direction avoiding or mitigating physical contact between the female carbon electrode and the male electric contact when the actuator drives the metallic pin into physical contact with the metallic pin receiver.

3. The high-voltage electric power switch of claim 1, wherein the female electrode comprises a tulip shape.

4. The high-voltage electric power switch of claim 3, further comprising a metallic fastener extending through the female electrode attaching the female electrode to the metallic pin receiver.

5. The high-voltage electric power switch of claim 1, wherein the male carbon contact comprises a shape preventing or mitigating physical contact with the female electric contact when the actuator drives the metallic pin into physical contact with the metallic pin receiver.

6. The high-voltage electric power switch of claim 1, wherein the male carbon contact defines a bore that is less than a bore of the metallic pin avoiding or mitigating physical contact between the male carbon electrode and the female electric contact when the actuator drives the metallic pin into physical contact with the metallic pin receiver.

7. The high-voltage electric power switch of claim 1, further comprising a metallic fastener extending through the male electrode attaching the male electrode to the metallic pin.

8. A high-voltage electric power switch comprising:
- a sealed container housing a dielectric gas comprising at least 60% carbon dioxide;
- a male electric contact located within the container comprising a metallic pin carrying a male carbon electrode;
- a female electric contact located within the container comprising a metallic pin receiver carrying a female carbon electrode positioned to receive the metallic pin within the metallic pin receiver;
- an actuator for driving the male or female electric contact along an axial direction for opening and closing a current path for an electric power line through the male electric contact and the female electric contact;

the male carbon electrode and the female carbon electrode forming an arc gap for the current path during the opening and closing of the current path;

wherein the male carbon contact comprises a shape preventing or mitigating physical contact with the female electric contact when the actuator drives the metallic pin into physical contact with the metallic pin receiver.

9. The high-voltage electric power switch of claim 8, wherein the male carbon contact defines a bore that is less than a bore of the metallic pin avoiding or mitigating physical contact between the male carbon electrode and the female electric contact when the actuator drives the metallic pin into physical contact with the metallic pin receiver.

10. The high-voltage electric power switch of claim 8, further comprising a metallic fastener extending through the male electrode attaching the male electrode to the metallic pin.

11. The high-voltage electric power switch of claim 8, wherein the female carbon electrode comprises a shape preventing or mitigating physical contact with the male electric contact when the actuator drives the metallic pin into physical contact with the metallic pin receiver.

12. The high-voltage electric power switch of claim 8, wherein:

the female electric contact comprises a junction between the female carbon electrode and the metallic pin receiver;

the female carbon electrode defines an initial slope at the junction away from the axial direction avoiding or mitigating physical contact between the female carbon electrode and the male electric contact when the actuator drives the metallic pin into physical contact with the metallic pin receiver.

13. The high-voltage electric power switch of claim 8, wherein the female electrode comprises a tulip shape.

14. The high-voltage electric power switch of claim 8, further comprising a metallic fastener extending through the female electrode attaching the female electrode to the metallic pin receiver.

15. A high-voltage electric power switch comprising:

a sealed container housing a dielectric gas comprising at least 60% carbon dioxide;

a male electric contact located within the container comprising a metallic pin carrying a male carbon electrode;

a female electric contact located within the container comprising a metallic pin receiver carrying a female carbon electrode positioned to receive the metallic pin within the metallic pin receiver;

an actuator for driving the male or female electric contact along an axial direction for opening and closing a current path for an electric power line through the male electric contact and the female electric contact;

the male carbon electrode and the female carbon electrode forming an arc gap for the current path during the opening and closing of the current path;

wherein the male carbon contact comprises a shape preventing or mitigating physical contact with the female electric contact when the actuator drives the metallic pin into physical contact with the metallic pin receiver;

wherein the female carbon electrode comprises a shape preventing or mitigating physical contact with the male electric contact when the actuator drives the metallic pin into physical contact with the metallic pin receiver.

16. The high-voltage electric power switch of claim 15, wherein the male carbon contact defines a bore that is less than a bore of the metallic pin avoiding or mitigating physical contact between the male carbon electrode and the female electric contact when the actuator drives the metallic pin into physical contact with the metallic pin receiver.

17. The high-voltage electric power switch of claim 15, wherein:

the female electric contact comprises a junction between the female carbon electrode and the metallic pin receiver;

the female carbon electrode defines an initial slope at the junction away from the axial direction avoiding or mitigating physical contact between the female carbon electrode and the male electric contact when the actuator drives the metallic pin into physical contact with the metallic pin receiver.

18. The high-voltage electric power switch of claim 15, wherein the female electrode comprises a tulip shape.

19. The high-voltage electric power switch of claim 15, further comprising:

a metallic fastener extending through the male electrode attaching the male electrode to the metallic pin.

20. The high-voltage electric power switch of claim 15, further comprising a metallic fastener extending through the female electrode attaching the female electrode to the metallic pin receiver.

* * * * *